Feb. 4, 1958

C. S. WEBBER 2,822,290

RELEASE COATINGS

Filed April 5, 1955

FIG. 1
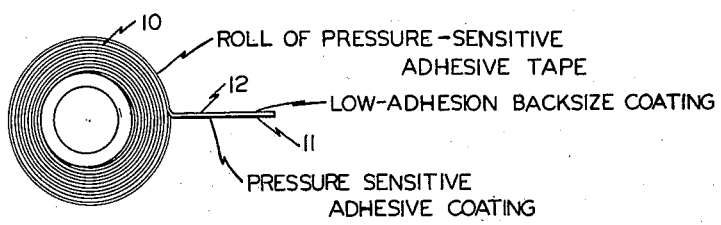
- ROLL OF PRESSURE-SENSITIVE ADHESIVE TAPE
- LOW-ADHESION BACKSIZE COATING
- PRESSURE SENSITIVE ADHESIVE COATING FIG. 2
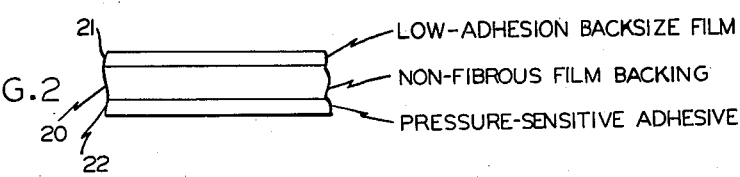
- LOW-ADHESION BACKSIZE FILM
- NON-FIBROUS FILM BACKING
- PRESSURE-SENSITIVE ADHESIVE FIG. 3
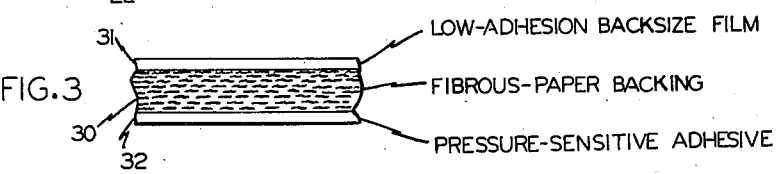
- LOW-ADHESION BACKSIZE FILM
- FIBROUS-PAPER BACKING
- PRESSURE-SENSITIVE ADHESIVE FIG. 4
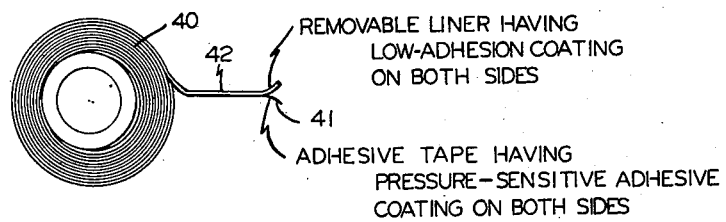
- REMOVABLE LINER HAVING LOW-ADHESION COATING ON BOTH SIDES
- ADHESIVE TAPE HAVING PRESSURE-SENSITIVE ADHESIVE COATING ON BOTH SIDES

INVENTOR.
CHARLES S. WEBBER
BY
ATTORNEY

United States Patent Office 2,822,290
Patented Feb. 4, 1958

2,822,290

RELEASE COATINGS

Charles S. Webber, Loudonville, N. Y., assignor to Norton Company, Troy, N. Y., a corporation of Massachusetts Application April 5, 1955, Serial No. 499,497

17 Claims. (Cl. 117—68.5)

The present invention relates in general to the manufacture of pressure-sensitive tape, and more particularly to the provision of improved low adhesion coatings for application to pliable, flexible backings such as the backings of pressure-sensitive tapes and/or to the surfaces of liners for use with pressure-sensitive tapes.

Pressure-sensitive tape is almost universally made by coating wide webs of backing material such as paper, impregnated paper, cloth, non-fibrous film or the like, with a pressure-sensitive adhesive mass and then rolling the coated web up into large rolls which are later slit into a plurality of rolls of narrower widths. The actual structure of the tape may vary fairly widely in that primer coats, barrier coats, backsize coats, reinforcing filament layers and the like may be added to the basic backing-adhesive structure.

In every case, however, one of the principal problems encountered is that of undesirable adherence of the adhesive mass to the next adjacent layer of tape in the roll. Most pressure-sensitive adhesives are designed to be aggressively tacky in order that tapes made therewith will adhere tenaciously to surfaces to which they may be applied. This property of the adhesive also causes aggressive adhesion between the layers of tape in the roll unless special treatments of the backing are employed. Such adhesion in the roll causes a very hard unwind of the tape which is tiring to the operator using the tape, causes an excessive amount of stretch to be imparted to the tape as it is removed from the roll, and may cause pick-off or transfer of the backsize coating to the adhesive mass and, in severe cases, actual delamination of the tape backings.

This problem is also encountered, and perhaps in even greater measure, in the case of double-face tapes, i. e. tapes carrying a coating of pressure-sensitive adhesive on both faces rather than on only one face thereof. In such instances, these tapes are rolled with a liner strip of paper, cloth, film or the like intercalated between the adhesive faces of adjoining layers of tape. With two adhesive faces in contact with the liner surfaces, the problems of hard unwind, stretch, and delamination referred to above are multiplied.

The obvious expedient to overcome this serious disadvantage is to coat the back of the tape or the surfaces of the tape liners with a material to which the aggressive pressure-sensitive adhesive does not adhere or at least adheres to a relatively slight degree. This expedient has been adopted by the art and is in common usage in all commercial production. However, there is a problem in connection with such materials, which are hereinafter referred to as "release agents" and, when applied to the tape, as "release coatings." Many materials which could be used as release agents function so well that the pressure-sensitive adhesive will not adhere to them at all. This characteristic is bad in that the rolls are then not capable of holding their form and in that when the tape is used, it is almost always necessary to have some overlap wherein one piece of tape must be placed over and adhered to the back of another piece of tape. Also, the tendency of many release agents to transfer or migrate from the tape backing or liner surface to and into the adhesive mass is a serious problem. This characteristic reduces and sometimes destroys the aggressive adhesive powers of the adhesive mass. Accordingly, it is necessary to strike a balance in which the release agent has the properties of some adhesive attraction for the mass, but substantially less than that of the untreated backing, coupled with the ability to cling tightly to the backing and to resist all forces tending to cause transfer thereof to the adhesive mass.

Accordingly, it is an object of the present invention to provide improved release coatings for pressure-sensitive adhesive tapes and liners.

Another object of the present invention is to provide low adhesion coatings adapted to removably contact a wide variety of tacky adhesive surfaces.

A further object is to provide improved articles having such low adhesion release coatings, including adhesive tapes and liners therefor.

Another object is to provide release coatings which will tenaciously adhere to a wide variety of base surfaces and will not transfer to a contacting adhesive mass.

Additional objects, if not specifically set forth herein, will be readily apparent to one skilled in the art from the following detailed description of the invention:

In the drawings:

Figure 1 is a side view of a roll of pressure sensitive adhesive tape showing one embodiment of the present invention.

Figure 2 is a cross section of a piece of non-fibrous film backed tape showing the location of the low-adhesion backsize film of the present invention.

Figure 3 is a cross section of a piece of fibrous pressure sensitive adhesive tape showing the location of the low-adhesion backsize film of the present invention.

Figure 4 is a side view of a roll of double faced pressure sensitive adhesive tape showing a removable liner coated on both faces thereof with the low-adhesion coating of the present invention.

Generally, the present invention is based on my discovery that compounds containing ionizable hydrogen and comprising long chain alkyl amine salts and amides of polybasic inorganic acids and acid esters thereof give release coatings of high efficiency when applied to a tape backing or to a liner for pressure-sensitive adhesive tapes.

More specifically, I have found that long chain ionizable hydrogen-containing alkyl amine salts and amides of polybasic inorganic acids, particularly of those polybasic inorganic acids containing at least one of the elements—sulfur, phosphorous or boron, and long chain alkyl acid esters thereof, adhere firmly to many varied base surfaces, do not transfer or migrate to adhesive surfaces in contact therewith even over extended periods of time, and provide a very low adhesion surface to a wide variety of normally aggressive, tacky pressure-sensitive adhesive.

Among the many compounds of this type which have been prepared and tested as release agents in combination with both fibrous and non-fibrous backed pressure-sensitive adhesive tapes and liners therefor, are the octadecylamine salt of mono-octadecyl acid orthophosphate, the octadecylamine salt of mono-dodecyl acid orthophosphate, the octadecylamine salt of sulfamic acid, the hexadecylamine salt of mono-octadecyl acid orthophosphate, the hexadecylamine salt of mono-dodecyl acid orthophosphate, the octadecylamine salt of benzine phosphinic acid, the dodecyl amine salt of mono-octadecyl acid orthophosphate, the N-octadecyltrimethylene diamine salt of mono-octadecyl acid orthophosphate, the dodecylamine salt of dodecyl acid orthophosphate, the N-octadecyltrimethylene diamine salt of mono-dodecyl acid orthophosphate, the octadecylamine salt of di-octyl acid pyrophosphate, the mono-hydroxy tertiary butylamine salt of mono-octadecyl acid orthophosphate, the cyclohexylamine salt of mono-octadecyl acid orthophosphate, the morpholine salt of mono-octadecyl acid orthophosphate, the hydroxymethyl ethylmethylamine salt of mono-octadecyl acid orthophosphate, the 1, hydroxyethyl-2, undecyl imidazoline salt of mono-octadecyl acid orthophosphate, the octadecyl amide of octadecyl acid orthophosphate, the 1, amino ethyl-2, undecyl imidazoline salt of mono-octadecyl acid orthophosphate, the 1, ethylene diamino-2, undecyl imidazoline salt of mono-octadecyl acid orthophosphate, the octadecylamine salt of boric acid, the 1, hydroxyethyl-2, undecyl imidazoline salt of mono-dodecyl acid orthophosphate, the 1, amino ethyl-2, undecyl imidazoline salt of mono-dodecyl acid orthophosphate, the octadecylamide of dodecyl acid orthophosphate, the 1, ethylene diamino-2, undecyl imidazoline salt of mono-dodecyl acid orthophosphate, N-octadecyl ammonium sulfate, the 1, hydroxyethyl-2, heptadecyl imidazoline salt of mono-octadecyl acid orthophosphate, N-octadecyl ammonium acid sulfate, the 1, amino ethyl-2, heptadecyl imidazoline salt of mono-octadecyl acid orthophosphate, the 1, ethylene diamino-2, heptadecyl imidazoline salt of mono-octadecyl acid orthophosphate, the octadecylamine salt of benzine phosphonic acid, the morpholine salt of mono-dodecyl acid orthophosphate, the dodecylamine salt of benzine phosphonic acid, the hexamethylenediamine salt of mono-dodecyl acid orthophosphate, and the propylenediamine salt of mono-dodecyl acid orthophosphate.

The term "long chain alkyl" as used herein refers to a carbon chain length of at least 8 carbon atoms—preferably from 12 to 18 C atoms.

The term "alkyl amine" as used herein refers to both the pure and the commercially available compounds. The commercial compounds are derived from naturally occurring fats containing a major proportion of one fatty acid and minor proportions of lower and/or higher fatty acids.

Expressed in terms of structural formulae, typical compounds included within the scope of the improved release coatings of the present invention may be illustrated as follows:

A. Compounds having the structural formula:

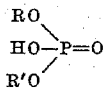

wherein R represents hydrogen or a straight chain alkyl group having at least 8 C atoms; and R' may be R"NH₃, R"₂NH₂, R"₃NH or NH₄ (wherein R" is an alkyl, aryl, alicyl, ara-alkyl, heterocyl or alkenyl group) and B. Compounds having the structural formula:

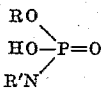

wherein R represents hydrogen or a straight chain alkyl group having at least 8 C atoms; and R' may be HR", R"₂ or H₂ (wherein R" is an alkyl, aryl, alkenyl, ara-alkyl, heterocyl or alkenyl group).

In both A and B supra, when more than one R" is indicated, such substituents may be the same or dissimilar groups, i. e. an alkyl and an aryl group, an alicyl and a heterocyl group, etc.

The compounds used in the release coatings of the present invention may be prepared by the partial neutralization of a long chain alkyl ester of a polybasic inorganic acid or acid ester thereof with a long chain alkyl amine. The hydrogen on the acid or ester is only partially substituted with the amine, leaving at least ⅛ to 1½ equivalent hydrogens on the acid or acid ester. Generally speaking, neutralization to a pH of from about 3 up to about 7 will produce satisfactory compounds for use in the present invention. It is necessary that the release compound contain at least some ionizable hydrogen.

Referring to the structural formulae given above, it will be seen that a free acid group remains on the compound in every instance. Unless present in the compound, adequate bonding of the release agent to the substrate will not occur and undue transfer thereof to the adhesive surface will generally result. Tests on completely neutralized compounds similar to those disclosed above, but containing no ionizable hydrogen, have resulted in substantial "pick-off" or transfer of the release compound to the adhesive surface in unacceptable amounts. When the release agent, as is the usual case, is applied to a hydrophilic substrate, the free OH group on both the release compound and the surface to which it is applied tend to cooperate to firmly bond the release agent to the substrate. As an illustration of this bonding effect, the release agents of the present invention have been applied to a hydrophilic surface, e. g. glass, cellophane, alkyd resin, etc., in a solution of warm toluene. After drying and heating above the melting point, scrubbing with the same solvent, failed to remove the release coating from the substrate.

As a preferred method of preparation, a solution of an alkyl acid ester in an organic solvent such as methyl ethyl ketone is partially neutralized with a solution of an alkyl amine in the same solvent at a temperature of 60–70° C. The alkyl amine first forms a salt which may be used directly as a release agent or may be dehydrated by further heating to form an amide which may be used as a release agent.

The following specific examples are illustrative of the preparation of such compounds:

*Example I*

78.5 grams mono-octadecyl acid orthophosphate were dissolved with stirring and heating to 65–70° C. in 394 grams methyl ethyl ketone in a 3 liter balloon flask under reflux. A solution of 62 grams octadecyl amine in 408 grams methyl ethyl ketone were added in a fine stream to the mono-octadecyl acid orthophosphate solution while heating and stirring over a 30 minute interval. Heating was then continued for one hour at 65–70° C. The reaction was then cooled to room temperature and the precipitate formed was filtered on a Büchner funnel and washed with methyl ethyl ketone until a colorless filtrate was obtained. The product was a nearly white powder with a melting point of 84° C., and was found to impart a pH of 4.5 to distilled water. The product was soluble on warming in toluol, chloroform, carbon tetrachloride, Cellosolve, and mixtures of these with 20% by volume methanol, and insoluble in water.

*Example II*

To 71 g. n-octyl acid orthophosphate dissolved in 100 g. of methyl ethyl ketone in a 1000 ml. 3 neck balloon flask with a heating jacket and voltage regulator and carrying a reflux condenser, motor stirrer and thermometer, 92 g. of octadecyl amine in 250 g. methyl ethyl ketone at 65–75° C. were added dropwise from a dropping funnel. The octadecyl amine was a commercial product consisting primarily of octadecyl amine (93%) with 6% hexadecyl amine and 1% octadecadienyl amine. The addition required 40 minutes while maintaining a temperature of 63–80° C. The product began to precipitate out of solution at 30 minutes. The temperature was held at 63–74° C. while stirring for another hour before cooling to room temperature, whereupon the product was filtered on a Büchner funnel and washed with methyl ethyl ketone until a colorless filtrate was obtained. The product was finally dried in vacuo. It was a white soft crystalline product with a pH of 4.5 and a M. P. of 110° C.

*Example III*

32.7 g. sulfuric acid (98%) was weighed into a 1000 ml. 3 neck balloon flask with reflux condenser, motor stirrer (glass) and thermometer. 300 g. toluene were then added and the stirrer started. To the rapidly stirring sulfuric acid dispersion there was added dropwise over a period of one hour a solution of 93 g. octadecyl amine in 200 ml. of toluene at 70° C. The reaction temperature was held at 40–54° C. and maintained for 45 minutes longer. The product was recovered after cooling to room temperature by filtering on a Büchner funnel and washing with toluol to remove colored impurities. A white soap-like crystalline product was obtained which was insoluble in water, but soluble in hot toluene. The pH was approximately 4 and the melting point 88–96° C.

*Example IV*

87.5 g. of mono-octadecyl acid orthophosphate were dissolved in 200 g. methyl ethyl ketone in a 2 liter flask fitted with reflux condenser, stirrer and thermometer, and heated by an external jacket to 60° C. To this solution, there was added dropwise 88.7 g. of 1-hydroxyl ethyl 2-undecyl imidazoline dissolved in 250 g. of methyl ethyl ketone at 60–70° C. over a period of 1 to 1¼ hours. The temperature of the reaction was held between 60° and 80° C. during the addition and for 15 to 60 minutes longer. No precipitate formed until the reaction was cooled to room temperature. The product was recovered by filtering on a Büchner funnel and washing with methyl ethyl ketone until a colorless filtrate was obtained. The product has a pH of 6.2 when dispersed in water, and a melting point of 70° C. This amine salt was soluble in warm toluene, insoluble in water.

*Example V*

15.5 g. metaphosphoric acid were dissolved in 246 g. methyl ethyl ketone in a 1 liter 3 neck balloon flask with reflux condenser, motor stirrer, thermometer well, and external heating jacket. 110 g. tetradecyl amine dissolved in 200 g. methyl ethyl ketone at 50° C. was added dropwise to the acid solution, holding the temperature below 50° C. The addition was completed in one hour and the heating was extended for 10 hours at 80° C. The product was filtered on a Büchner funnel and washed with methyl ethyl ketone to remove any unreacted materials. The product was very slightly soluble in water, but soluble in toluene-alcohol (80–20) with warming. pH reading was 6.7, M. P. 215–220° C.

*Example VI*

38.4 g. 85% phosphoric acid was dissolved in 400 g. methyl ethyl ketone while stirring and heating under reflux in a 3 liter balloon flask fitted with an external heating jacket. Added dropwise to this was 127.3 g. dodecylamine dissolved in 300 g. methyl ethyl ketone at 60° C., over a period of 130 minutes. The product precipitated from the reaction mixture and was recovered on a Büchner funnel and washed repeatedly with methyl ethyl ketone until a clear, colorless filtrate was obtained. The product after drying in vacuo was found to have a melting point of 154° C., a pH of 6.5 and was only very slightly soluble in water but soluble in hot toluene and carbon tetrachloride-alcohol (80–20).

*Example VII*

116.7 g. monostearyl acid orthophosphate were dissolved in 200 g. methyl ethyl ketone while heating to 70° C. in a 1 liter 3 neck balloon flask under reflux and with motor stirrer. When completely in solution, 33 g. of cyclohexylamine in 160 g. methyl ethyl ketone were added dropwise over a period of 60 minutes while stirring. Heating was continued for 30 minutes longer before cooling to 25° C. and filtering on a Büchner funnel. The product was washed with methyl ethyl ketone until a colorless filtrate was obtained. The product was very insoluble in water but soluble in warm toluene. The melting point was 70° C. and the pH 4.5.

*Example VIII*

91.1 g. phosphorous acid (30%—sp. g. 1.12) was placed in a 1 liter 3 neck balloon flask fitted with a reflux condenser, motor stirrer, thermometer, addition tube and heating jacket. 150 g. methyl ethyl ketone was added and the stirrer started. There were then added dropwise over a period of 30 minutes 120 g. 1-hydroxyethyl 2-heptadecyl imidazoline in 250 g. of methyl ethyl ketone at 50° C. Heating of the reaction was extended for 3 hours, followed by cooling to 20° C. The product was filtered on a Büchner funnel, washed with methyl ethyl ketone and dried in vacuo. The yield was 154 g. of a soap-like product with a final melting point of 210° C. Soluble in hot toluene, pH was 3.65.

*Example IX*

66 g. hypophosphorous acid (50%) with 101 g. methyl ethyl ketone were placed in a one liter 3 neck balloon flask fitted with a reflux condenser, motor stirrer, thermometer, addition tube and heating jacket. The motor was started and 126 g. hexadecylamine dissolved in 200 g. warm methyl ethyl ketone (60° C.) was added dropwise over a period of one hour, while raising the temperature from 27° to 66° C. The heating was extended for 80 minutes to 69° C. On standing overnight, the whole solution gradually solidified to a mush of flaky crystals which was filtered on a Büchner funnel and washed with methyl ethyl ketone. This product was water soluble with a pH of 4.1, also soluble in toluene-methanol. The melting point was 73° C.

*Example X*

116.7 g. mono-octadecyl acid orthophosphate was dissolved in 200 g. methyl ethyl ketone in a 1 liter 3 neck balloon flask fitted with a reflux condenser, motor stirrer, thermometer, addition tube and a heating jacket. Added dropwise over a period of 50 minutes while stirring and heating were 29 g. morpholine dissolved in 150 g. methyl ethyl ketone. The temperature was raised gradually to 78° C. from 26° C. during 150 minutes. The reaction was cooled to room temperature and the product was recovered on Büchner funnel and washed with methyl ethyl ketone. Yield 128 g. with a 70° C. melting point and pH of 6.5. Soluble in hot toluene and only slightly soluble in water.

*Example XI*

This salt was prepared using an approximate mol ratio of one of the diamine to two of the mono-alkyl acid orthophosphate. 88.6 g. mono-dodecyl acid orthophosphate were dispersed in 200 g. methyl ethyl ketone at 60° C. in a 1 liter 3 neck flask carrying a reflux condenser, motor stirrer, thermometer, addition tube and external heating jacket. 19.3 g. hexamethylene diamine in 163 g. methyl ethyl ketone were added dropwise over a period of 55 minutes at 68–72° C. The heating was continued for 80 minutes and the reaction was then cooled to 25° C. The precipitate formed was filtered off on a Büchner funnel, rinsed with methyl ethyl ketone, air dryed and vacuum dried to yield 85 g. of a white soap-like product with a melting point of 103° C. and a pH of 5.6, soluble in hot toluene, very slightly soluble in water.

In forming the release coatings of the present invention, I may apply any of the afore-mentioned compounds, or mixtures thereof, to the surface to be treated in a solvent at a low concentration, i. e. ½–5%, or preferably with a carrier such as an alkylated urea-formaldehyde resin, melamine-formaldehyde resin, phenol-formaldehyde resin, a modified alkyd resin and/or other similar film-forming materials. It has been found that the use of a resin carrier for the release agent gives superior coatings as far as the properties of anti-aging and nontransference are concerned.

In applying the coating, the release agents of the present invention are dissolved in a solvent, e. g. warm toluene, carbon tetrachloride, trichloroethylene or the like, to give a ½ to 5% solution by weight. The solution is maintained at 140°–180° F. in the case of toluene, or sufficient to prevent the precipitation of the release agent. The solution may be spray coated, roll coated, doctor bar coated, air brush coated, electrostatically coated, dip coated, etc. to give an even, thin coat, i. e. a mono- to tri-molecular layer, of the release agent on the surface to be rendered non-adhesive to the mass coat of pressure-sensitive adhesive. The weight coated, for example, with a 2% solution, is in the order of about 0.2 to 0.8 ounce per square yard. The top coat anti-adhesive solution may be modified with a resin and/or varnish composition to aid in bonding the release agent to the substrate. A range of from equal parts by weight of release agent to resin up to 10 parts release agent to 1 part resin may be used. The resin may be any alkyd, urea-formaldehyde, melamine-formaldehyde, vinyl chloride, vinyl chloride-acetate, cellulose ester or ether, polyacrylate, oleo-resinous varnish, phenolic, polyester or the like which has adhesive properties for the substrate and is mutually soluble in a common volatile solvent with the release agent selected.

After application, the top coat may be dried by any suitable means such as a forced air circulator with temperature controls. Depending upon the dwell in the oven, the drying may take place at any desired level below the boiling point of the solvent employed to carry the release agent. When thoroughly dry, the sheet coated with the release agent may be cured, if desired, to harden or set the substrate and/or associated modifying resin or varnish if required. A heating period of from 10 to 30 minutes at 275° F. ±50° F. is usually sufficient to give good results.

It has been found that the release coatings of my present invention firmly attached to a very wide variety of surfaces, including among others, cellophane, glass, alkyd varnishes, polymethacrylates, cellulose esters and ethers, polyvinyl phthalate, and nylon, the bond between the release coatings and all surfaces, such as those listed above, to which they have been applied has exceeded in strength any adhesive force between the release coatings and the most aggressively tacky pressure-sensitive adhesive masses.

As indicated above, one of the necessary properties in a good release coating for use on pressure-sensitive adhesive tapes and/or liners is that of low adhesion between the pressure-sensitive mass and the release coating. Also, as pointed out above, it is necessary to retain some degree of adhesion since it is necessary that one layer of tape will stick to another when it is overlapped in actual usage. The following table illustrates the improvement in unwind adhesion of tapes (A) having an alkyd resin type backsize with a release coating of the present invention, e. g. the octadecyl amine salt of mono-octadecyl acid orthophosphate, and a similar tape (B) having a release coating of the octadecyl amine salt of mono-dodecyl acid orthophosphate as contrasted with the same tape (C) minus any release coating. The recorded values likewise indicate that sufficient adhesion is retained to permit overlap of tape in actual usage. In each instance, the tape backing was paper, impregnated with a rubber-base saturant, and the mass of the rubber-resin type.

|     | Unwind Speed (Ft./min.) | Pull required to unwind (#/in.) | |
|-----|---|---|---|
|     |   | Original | Aged (16 hours at 130° F.) |
| (A) | 40 | 1.6 | 2.7 |
|     | 240 | 2.2 | 3.5 |
|     | 315 | 2.7 | 4.3 |
| (B) | 40 | 1.8 | 2.8 |
|     | 240 | 2.3 | 4.6 |
|     | 315 | 3.1 | 4.9 |
| (C) | 40 | 3.7 | 3.5 |
|     | 240 | 5.1 | 4.8 |
|     | 315 | 6.0 | 6.9 |

As is evident from the above table, the rate of unwind was varied for the tape rolls (1" width), and the force required at the varying speeds to strip the tape from the rolls was recorded.

As above stated, the invention is not limited to any particular tape and/or liner, but is considered applicable to a very wide variety of tapes made with pressure-sensitive adhesives. The release coatings of the present invention have been applied to all of the usual tape backings such as impregnated paper, cellophane (non-moistureproofed regenerated cellulose films softened with glycerine), plasticized cellulose acetate, vinyl films, etc., both with and without a backsize. The release agents of the invention may be incorporated into a resin carrier, as aforesaid, to function as combined backsize and release coating if desired.

Any of the usual pressure-sensitive adhesive compositions known to the art may be used. By "pressure-sensitive adhesive" is meant an adhesive which is normally and aggressively tacky, more cohesive than adhesive, and which has a four-fold balance of adhesion, cohesion, stretchiness and elasticity. The most common types are the so-called rubber-resin adhesives in which natural or synthetic rubbers or mixtures thereof are modified with a tackifier resin (ester gum, rosin, etc.) in a proportion adapted to impart thereto the necessary tack and cohesive properties. Examples of such adhesives as well as other types of pressure-sensitive adhesives which may be used in formulating tapes for use with the present invention are given in U. S. 2,156,380; 2,177,627; 2,319,959; and 2,553,816. These adhesives may be used with or without primers or undercoats as desired.

Referring now to the drawings,

Figure 1 shows a roll of pressure sensitive adhesive tape 10 having a coating of pressure sensitive adhesive 11 on one face thereof and a low-adhesion backsize coating 12 on the opposite face.

Figure 2 illustrates in cross section a piece of non-fibrous film backed tape 20 having a low-adhesion backsize film 21 on one face thereof and a pressure sensitive adhesive coating 22 on the opposite face.

Figure 3 illustrates in cross section a piece of fibrous paper backed tape 30 having a low-adhesion backsize film 31 of the present invention on one surface thereof and a coating of pressure sensitive adhesive 32 on the opposite face.

Figure 4 illustrates a roll of double faced adhesive tape 40 wherein the adhesive tape 41 carries a coating of pressure sensitive adhesive on both sides thereof and intercalated with such tape 41 a removable liner 42 having low-adhesion coatings in accordance with the present invention on both sides thereof.

The release coatings of the present invention, when applied as described above, form a film of approximately mono-molecular to tri-molecular thickness in which the strongly polar acid phosphate groups act to bind the film to the substrate to which it is applied and the long alkyl amino or amide groups repel or decrease the adhesion of the tacky pressure-sensitive adhesive mass, preventing it from attaching itself firmly to the treated surface.

Generally, the compounds which act as the active release agent of the release coatings of the present invention have a fairly high melting point, i. e. above about 60° C. The melting point may be substantially above 60° C., as for example the 1-hydroxyethyl 2-heptadecyl imidazoline salt of phosphorous acid illustrated in Example VIII, supra, which has a melting point of 210° C.

Obviously, many modifications and variations of the invention as hereinbefore set forth may be made without departing from the spirit and scope thereof, and therefore only such limitations should be imposed as are indicated in the appended claims.

I claim:

1. A liner adapted to be placed in removable contact with an article having a normally tacky, pressure-sensitive adhesive surface, said liner having a release coating comprising as the active release agent thereof a compound containing ionizable hydrogen selected from the group consisting of the long chain alkyl amine salts and amides of polybasic inorganic acids and long chain alkyl acid esters thereof.

2. A normally tacky and pressure-sensitive adhesive tape having a release agent containing coating firmly adhered to the back surface thereof, said release agent comprising a compound containing ionizable hydrogen selected from the group consisting of the long chain alkyl amine salts and amides of polybasic inorganic acids containing at least one of the elements sulfur, phosphorous and boron, and long chain alkyl acid esters thereof.

3. A tape as in claim 2 wherein the long alkyl chains of the release agent contain at least 8 carbon atoms.

4. A normally tacky and pressure-sensitive tape comprising a non-fibrous film backing; a co-extensive, normally tacky pressure-sensitive adhesive coating firmly bonded to one surface of said backing; and a co-extensive release coating firmly bonded to the opposite face of said backing, said release coating being formed of a compound containing ionizable hydrogen selected from the group consisting of the long chain alkyl amine salts and amides of polybasic inorganic acids containing at least one of the elements, sulfur, phosphorous and boron and long chain alkyl acid esters thereof, the pressure-sensitive adhesive being inactive to the release coating to a degree permitting easy unwinding of the tape.

5. A normally tacky and pressure-sensitive tape comprising a non-fibrous film backing; a co-extensive, normally tacky pressure-sensitive adhesive coating firmly bonded to one surface of said backing; and a co-extensive release coating firmly bonded to the opposite face of said backing, said release coating being formed of a compound containing ionizable hydrogen selected from the group consisting of the long chain alkyl amine salts and amides of polybasic inorganic acids containing sulfur and long chain alkyl acid esters thereof; the pressure-sensitive adhesive being inactive to the release coating to a degree permitting easy unwinding of the tape.

6. A normally tacky and pressure-sensitive tape comprising a non-fibrous film backing; a co-extensive, normally tacky pressure-sensitive adhesive coating firmly bonded to one surface of said backing; and a co-extensive release coating firmly bonded to the opposite face of siad backing, said release coating being formed of a compound containing ionizable hydrogen selected from the group consisting of the long chain alkyl amine salts and amides of polybasic inorganic acids containing phosphorous and long chain alkyl acid esters thereof; the pressure-sensitive adhesive being inactive to the release coating to degree permitting easy unwinding of the tape.

7. A normally tacky and pressure-sensitive tape comprising a non-fibrous film backing; a co-extensive, normally tacky pressure-sensitive adhesive coating firmly bonded to one surface of said backing; and a co-extensive release coating firmly bonded to the opposite face of said backing, said release coating being formed of a compound containing ionizable hydrogen selected from the group consisting of the long chain alkyl amine salts and amides of polybasic inorganic acids containing boron and long chain alkyl acid esters thereof; the pressure-sensitive adhesive being inactive to the release coating to a degree permitting easy unwinding of the tape.

8. A normally tacky and pressure-sensitive tape comprising a flexible fibrous backing; a co-extensive, normally tacky pressure-sensitive adhesive coating firmly bonded to one surface of said backing; and a co-extensive release coating firmly bonded to the opposite face of said backing, said release coating being formed of a compound containing ionizable hydrogen selected from the group consisting of the long chain alkyl amine salts and amides of polybasic inorganic acids containing at least one of the elements, sulfur, phosphorous and boron and long chain alkyl acid esters thereof; the pressure-sensitive adhesive being inactive to the release coating to a degree permitting easy unwinding of the tape.

9. A normally tacky and pressure-sensitive tape comprising a flexible fibrous backing; a co-extensive, normally tacky pressure-sensitive adhesive coating firmly bonded to one surface of said backing; and a co-extensive release coating firmly bonded to the opposite face of said backing, said release coating being formed of a compound containing ionizable hydrogen selected from the group consisting of the long chain alkyl amine salts and amides of polybasic inorganic acids containing sulfur and long chain alkyl acid esters thereof; the pressure-sensitive adhesive being inactive to the release coating to a degree permitting easy unwinding of the tape.

10. A normally tacky and pressure-sensitive tape comprising a flexible fibrous backing; a co-extensive, normally tacky pressure-sensitive adhesive coating firmly bonded to one surface of said backing; and a co-extensive release coating firmly bonded to the opposite face of said backing, said release coating being formed of a compound containing ionizable hydrogen selected from the group consisting of the long chain alkyl amine salts and amides of polybasic inorganic acids containing phosphorous and long chain alkyl acid esters thereof; the pressure-sensitive adhesive being inactive to the release coating to a degree permitting easy unwinding of the tape.

11. A normally tacky and pressure-sensitive tape comprising a flexible fibrous backing; a co-extensive, normally tacky pressure-sensitive adhesive coating firmly bonded to one surface of said backing; and a co-extensive release coating firmly bonded to the opposite face of said backing, said release coating being formed of a compound containing ionizable hydrogen selected from the group consisting of the long chain alkyl amine salts and amides of polybasic inorganic acids containing boron and long chain alkyl acid esters thereof; the pressure-sensitive adhesive being inactive to the release coating to a degree permitting easy unwinding of the tape.

12. A flexible backing member having an exposed low adhesion release coating bonded to at least one surface thereof, said low adhesion release coating having as the active release agent thereof a compound containing ionizable hydrogen selected from the group consisting of the long chain alkyl amine and amide salts of polybasic inorganic acids and acid esters thereof.

13. A member as in claim 11 wherein said polybasic inorganic acids are selected from the group of polybasic inorganic acids containing at least one of the elements sulfur, phosphorous and boron.

14. A member as in claim 11 wherein the long chain alkyl radicals have at least 8 carbon atoms.

15. A flexible backing member having an exposed low adhesion release coating bonded to at least one surface thereof, said low adhesion release coating having as the active release agent thereof a compound containing ionizable hydrogen selected from the group consisting of (A) compounds having the structural formula:

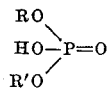

wherein R represents hydrogen or a straight chain alkyl group having at least 8 C atoms; and R' represents R''NH$_3$, R''$_2$NH$_2$, R''$_3$NH or NH$_4$ (wherein R'' is an alkyl, aryl, alicyl, ara-alkyl, heterocyl or alkenyl group); and (B) compounds having the structural formula:

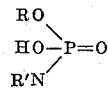

wherein R represents hydrogen or a straight chain alkyl group having at least 8 C atoms; and R' represents HR", R"$_2$ or H$_2$ (wherein R" is an alkyl, aryl, alkenyl, ara-alkyl, heterocyl or alicyl group).

16. A member as in claim 15 wherein said release coating is bonded to both surfaces of said backing member.

17. A member as in claim 15 wherein said release coating is bonded to one surface of said backing member and a pressure sensitive adhesive coating is bonded to the opposite surface thereof.

References Cited in the file of this patent

UNITED STATES PATENTS

| | | |
|---|---|---|
| 2,358,831 | Schieman | Sept. 26, 1944 |
| 2,450,083 | Donaldson | Sept. 28, 1948 |
| 2,458,166 | Homeyer | Jan. 4, 1949 |
| 2,532,011 | Dahlquist | Nov. 28, 1950 |
| 2,607,711 | Hendricks | Aug. 19, 1952 |
| 2,646,371 | McGarry | July 21, 1953 |